Nov. 17, 1970 | K. LAGEMANN | 3,541,356

RS, JK FLIP-FLOP BUILDING BLOCK FOR LOGICAL CIRCUITS

Filed Sept. 20, 1967 | 4 Sheets-Sheet 1

INVENTOR.
KLAUS LAGEMANN

BY

AGENT

Nov. 17, 1970 K. LAGEMANN 3,541,356

RS, JK FLIP-FLOP BUILDING BLOCK FOR LOGICAL CIRCUITS

Filed Sept. 20, 1967 4 Sheets-Sheet 2

INVENTOR.
KLAUS LAGEMANN
BY
AGENT

Nov. 17, 1970 K. LAGEMANN 3,541,356

RS, JK FLIP-FLOP BUILDING BLOCK FOR LOGICAL CIRCUITS

Filed Sept. 20, 1967 4 Sheets-Sheet 3

INVENTOR.
KLAUS LAGEMANN

BY [signature]

AGENT

Nov. 17, 1970 K. LAGEMANN 3,541,356

RS, JK FLIP-FLOP BUILDING BLOCK FOR LOGICAL CIRCUITS

Filed Sept. 20, 1967 4 Sheets-Sheet 4

INVENTOR.
KLAUS LAGEMANN

BY [signature]

AGENT

United States Patent Office 3,541,356

Patented Nov. 17, 1970

3,541,356

RS, JK FLIP-FLOP BUILDING BLOCK FOR LOGICAL CIRCUITS

Klaus Lagemann, Garstedt, Germany, assignor, by mesne assignments, to U.S. Philips Corporation, New York, N.Y., a corporation of Delaware

Filed Sept. 20, 1967, Ser. No. 669,071

Int. Cl. H03k *3/26*

U.S. Cl. 307—289 1 Claim

ABSTRACT OF THE DISCLOSURE

A bistable building block operable in a computer as either a JK or a DV flip-flop and constructed entirely of logical NOR gates.

The invention relates to a building block having a clock pulse terminal for receiving clock pulses, at least two condition terminals for receiving bivalent condition signals, a setting and a resetting terminal for receiving bivalent signals which set a circuit contained in the building at one of two stable positions, and two output terminals at which appear in each stable state two complementary bivalent output signals which depends on the position that the circuit within the building block occupied before the reception of the latest clock pulse and on the values of the condition signals it received during the reception of the latest clock pulse.

An object of the invention is to provide a building block for logical circuits, having at least four condition terminals and such that the circuit contained in the building block can function as a VD flip-flop or as a JK flip-flop depending on the values of the condition signals it receives at two of its condition terminals (for the signification of VD and JK flip-flops, see Montgomery Phister—Logical Design of Digital Computers, 1963, pp. 121–123).

Nowadays, building blocks for logical circuits, particularly electronic computers are normalized to have fourteen terminals. Since a circuit of the kind desired has only eleven terminals, the block can be given its normalized number of fourteen terminals by repeating some of its condition terminals through an OR- or an AND-gate. The purpose of the invention is attained by giving the circuit contained in the building block, in addition to the above mentioned two condition terminals (V and D), two further condition terminals (J and K), such that if the first condition terminal (V) receives the condition signal "0" the circuit does not change its state that if the first condition terminal (V) receives the condition signal "1" and the second condition terminal (D) the position in which $Q=0$ and $\overline{Q}=1$ if before it was not receives the condition signal "0" the circuit changes to already in that position, and that if the first and second condition terminals both receive the condition signal "1" the circuit functions as a JK flip-flop.

In order that the invention may be readily carried into effect, a few examples thereof will now be described in greater detail with reference to the accompanying drawings.

FIGS. 1 and 2 give examples of building blocks with two condition terminals.

FIGS. 3, 4, 5 and 6 give examples of building blocks containing a circuit with two condition inputs which are connected through a one- or two-stage logical circuit to condition terminals of the building block.

FIG. 7 gives an example of a building block containing a circuit with four condition inputs.

FIGS. 8, 9 and 10 give circuit diagrams of a circuit with four condition inputs.

FIG. 11 gives an example of the use of the circuits shown in FIG. 8, 9 or 10 in a building block with fourteen terminals.

FIG. 12 gives the circuit diagram of a circuit with seven condition inputs.

In FIG. 1 is shown a building block containing a circuit with a clock pulse input CP, two condition inputs $I_1$ and $I_2$, a set and a reset input $E_1$ and $E_2$ respectively, two supply voltage inputs $U_{cc}$ and $U_{EE}$ respectively, and two outputs Q and $\overline{Q}$ respectively. These in- and output form terminals of the building block. All input and output signals are bivalent, while at the output terminals Q and $\overline{Q}$ appears always complementary signals. The circuit has two stable states, and can change its state only if it receives a clock pulse. The new state of the circuit depends, in this case, on the values of the condition signals it received at its condition inputs during the reception of the clock pulse and on the state it occupied immediately before reception of the clock pulse.

The building blocks shown in FIGS. 3–6 all have 14 terminals.

Figure 1:
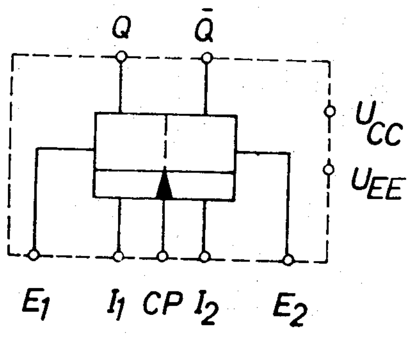
Figure 2:
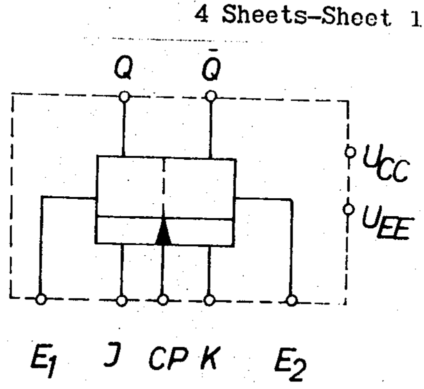
FIG. 2 shows a building block containing a JK flip-flop, the way of functioning of which is described in the above-mentioned book of Montgomery Phister.
Figure 3:
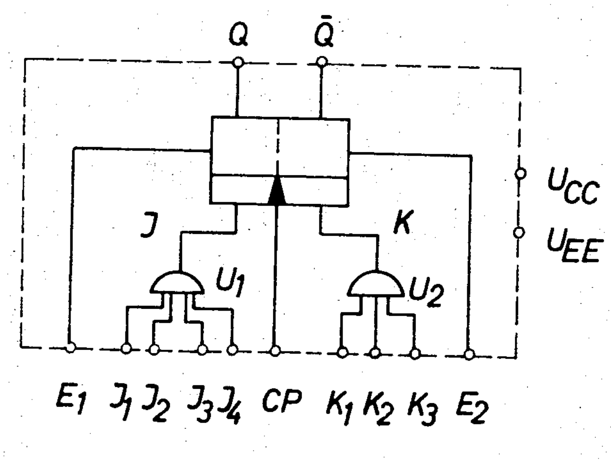
FIGS. 3 and 4 show two building blocks containing a JK flip-flop, the J- and K-inputs of which are each connected through an AND-gate (FIG. 3) or an OR-gate (FIG. 4) to a plurality of terminals of the building block.
Figure 4:
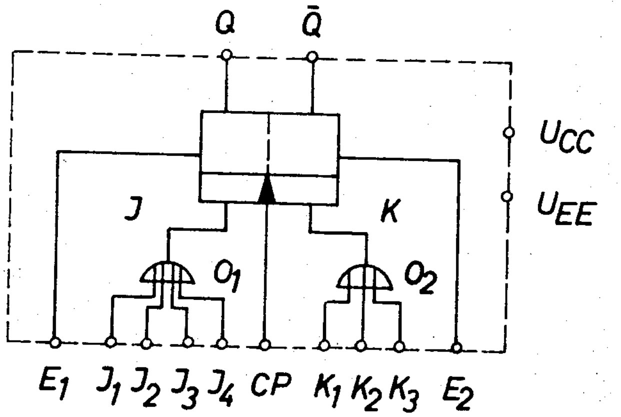
Figure 5:
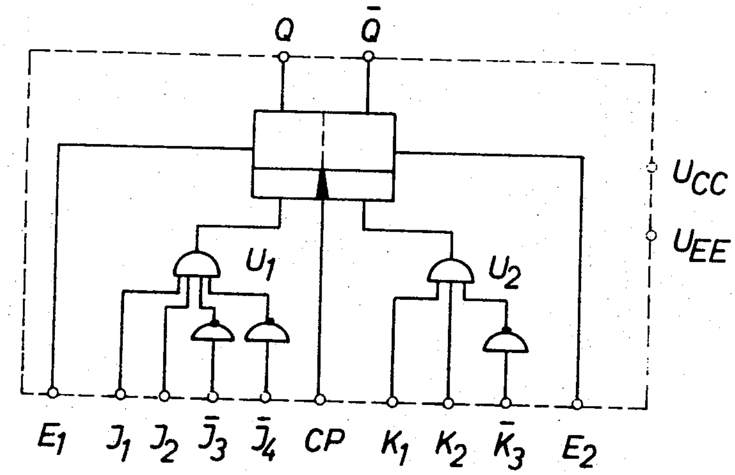
FIGS. 5 and 6 show two building blocks containing a JK flip-flop, the J- and K-inputs of which are each connected through a two-stage logical circuit to a plurality of terminals of the building block.
Figure 6:
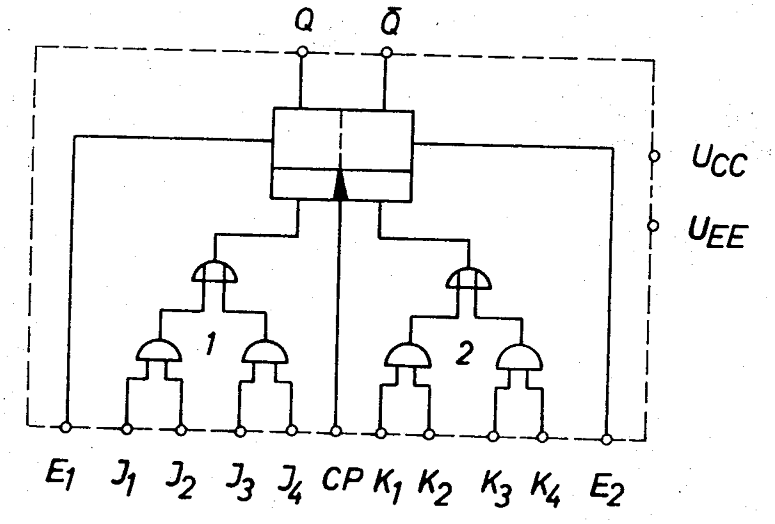
Figure 7:
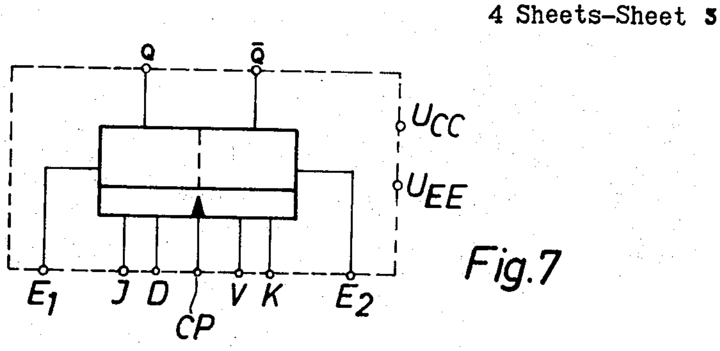

FIG. 7 shows a building block according to the invention containing a bistable circuit with four condition terminals V, D, J and K, which can be seen as a combination of a VD flip-flop and a JK flip-flop as described in the book of Montgomery Phister. The reactions of this bistable circuit on the reception of a clock pulse are the following:

(1) If $V=0$, the circuit does not change its state, i.e., the output signals Q and $\overline{Q}$ do not alter. This is true independently of the values of the condition signals D, J and K (for simplicity the signal applied to condition terminal V is denoted by V, etc.).

(2) If $V=1$, $D=0$ the circuit changes to the state in which $Q=0$ and $\overline{Q}=1$ if before it was in the other state and does not change its state if it were already in the state in which $Q=0$ and $\overline{Q}=1$. This is true independently of the values of the condition signals J and K.

(3) If $V=1$, $D=1$ the circuit functions as an ordinary JK flip-flop.

Figure 8:
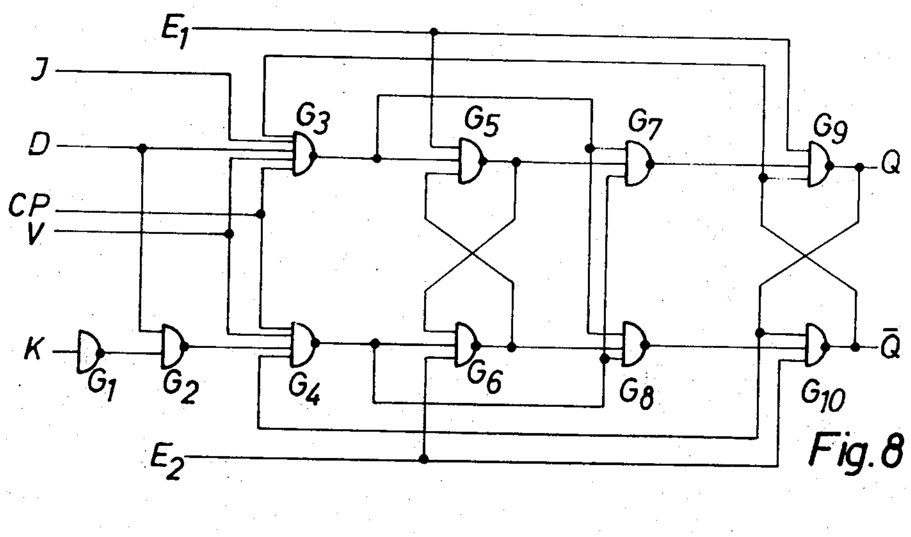

FIG. 8 gives the diagram of a circuit having the required properties. It is composed of ten NAND-gates $G_1, G_2 \ldots G_{10}$. (Note that a NAND-gate with only one input is an inverter.)

Figure 9:
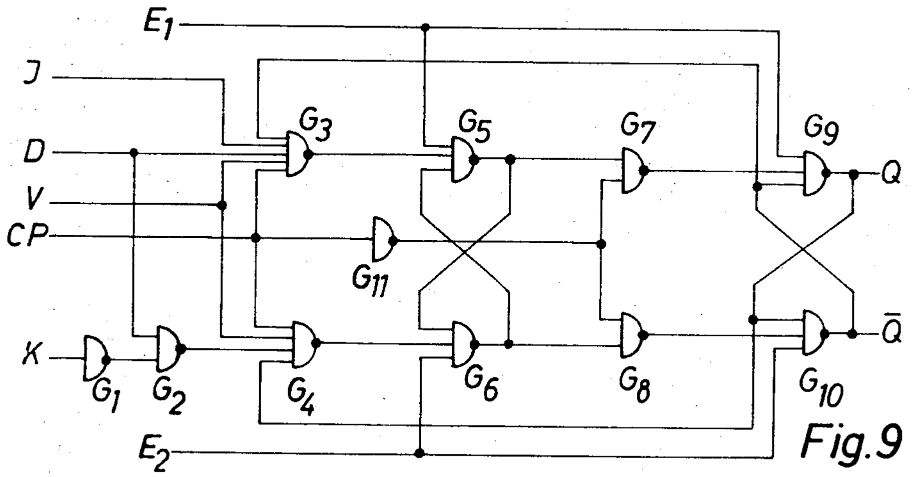
Figure 10:
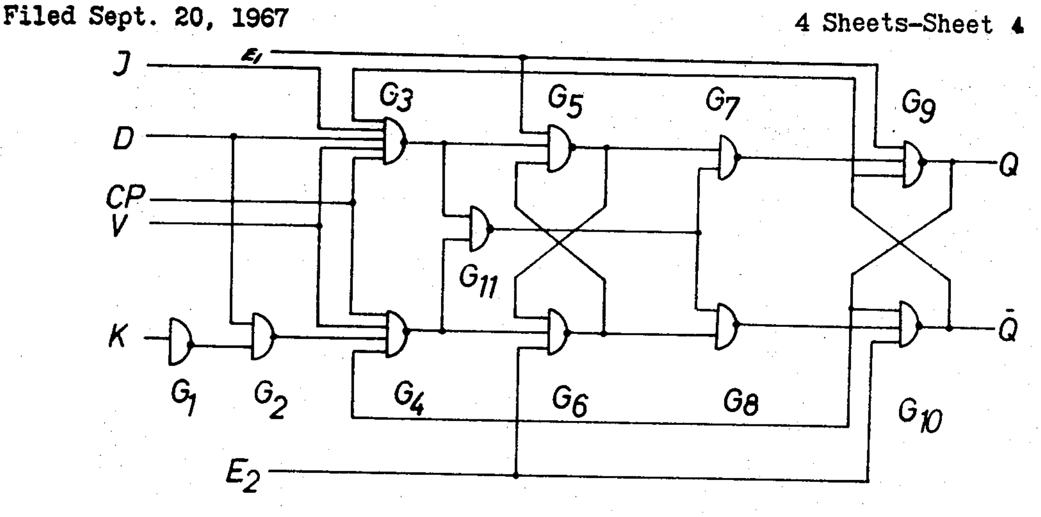

FIGS. 9 and 10 give examples of two other circuits having the required properties.

Figure 11:
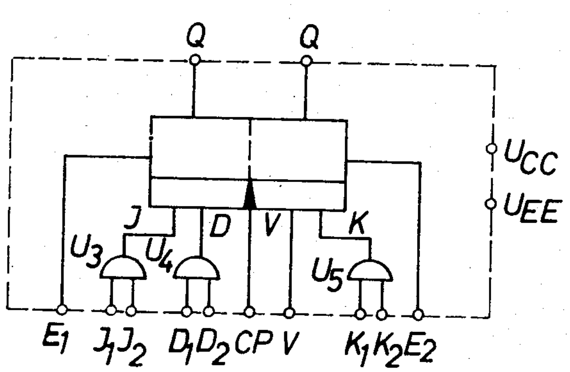

FIG. 11 gives an example of a building block containing a circuit having the required properties but the J, D and K inputs are each connected through an AND-gate to two corresponding terminals of the building block, so giving it 14 terminals.

Figure 12:
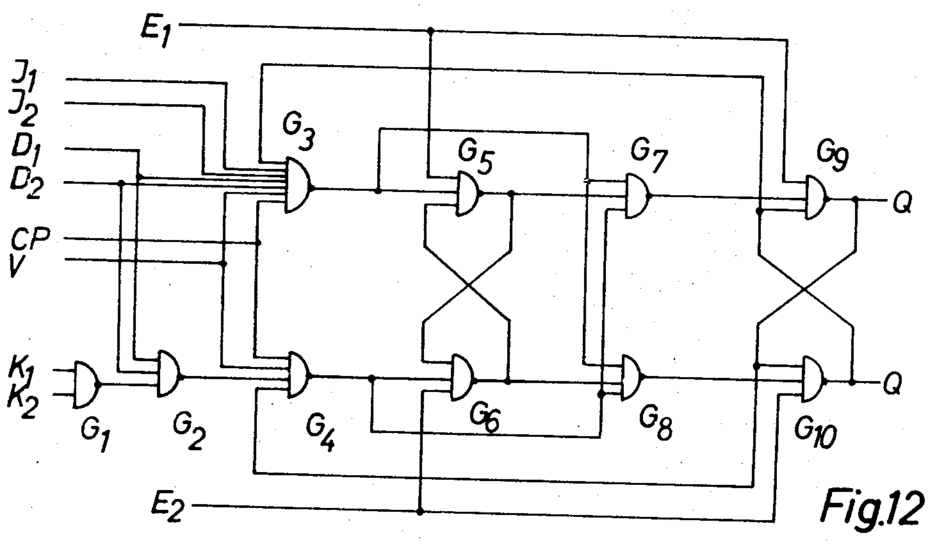

FIG. 12 gives the diagram of a circuit with ten inputs and two outputs (the two supply inputs are not shown in this figure).

What is claimed is:

1. Building block having a clock pulse terminal for receiving clock pulses, at least two condition terminals for receiving bivalent condition signals, a setting and a resetting terminal for receiving bivalent signals which set a circuit contained in the building at one of two stable positions, and two output terminals at which appear in each stable state two complementary bivalent output signals which depend on the position that the circuit within the building block occupied before the reception of the latest clock pulse and on the values of the condition signals it received during the reception of the latest clock pulse, characterized in that the circuit contained in the building block has, in addition to the above mentioined two condition terminals (V and D), two further condition terminals (J and K), such that if the first condition terminal (V) receives the condition signal "0" the circuit does not change its state, that if the first condition terminal (V) receives the condition signal "1" and the second condition terminal (D) receives the condition signal "0" the circuit changes to the position in which $Q=0$ and $\overline{Q}=1$ if before it was not already in that position, and that if the first and second condition terminals both receive the condition signal "1" the circuit functions as a JK flip-flop.

References Cited

UNITED STATES PATENTS

| | | | |
|---|---|---|---|
| 3,401,272 | 9/1968 | May | 307—276 X |
| 3,444,395 | 5/1969 | Foster et al. | 307—291 |

DONALD D. FORRER, Primary Examiner

J. D. FREW, Assistant Examiner

U.S. Cl. X.R.

307—276, 291, 292